US010981582B2

(12) United States Patent
Kroiss et al.

(10) Patent No.: US 10,981,582 B2
(45) Date of Patent: Apr. 20, 2021

(54) RAIL VEHICLE, IN PARTICULAR LOCOMOTIVE

(71) Applicant: SIEMENS MOBILITY GMBH, Munich (DE)

(72) Inventors: Manuel Kroiss, Ebersbach (DE); Thomas Langenbacher, Mering (DE); Guenther Proell, Augsburg (DE); Hannes Peer, Munich (DE)

(73) Assignee: Siemens Mobility GmbH, Munich (DE)

( * ) Notice: Subject to any disclaimer, the term of this patent is extended or adjusted under 35 U.S.C. 154(b) by 293 days.

(21) Appl. No.: 16/088,510

(22) PCT Filed: Feb. 10, 2017

(86) PCT No.: PCT/EP2017/052950
§ 371 (c)(1),
(2) Date: Sep. 26, 2018

(87) PCT Pub. No.: WO2017/167488
PCT Pub. Date: Oct. 5, 2017

(65) Prior Publication Data
US 2019/0106128 A1    Apr. 11, 2019

(30) Foreign Application Priority Data
Mar. 31, 2016    (DE) .......................... 102016205305.1

(51) Int. Cl.
*B61D 17/02*    (2006.01)
*B61C 17/00*    (2006.01)
*B61D 17/04*    (2006.01)

(52) U.S. Cl.
CPC .............. *B61D 17/02* (2013.01); *B61C 17/00* (2013.01); *B61D 17/045* (2013.01); *Y02T 30/00* (2013.01)

(58) Field of Classification Search
CPC ......... B61D 17/00; B61D 17/02; B61D 17/06
See application file for complete search history.

(56) References Cited

U.S. PATENT DOCUMENTS

| 8,757,066 B2 | 6/2014 | Heinisch et al. |
| 2013/0133545 A1 | 5/2013 | Schober et al. |
| 2013/0291758 A1 | 11/2013 | Orellano et al. |
| 2015/0191180 A1 | 7/2015 | Langert et al. |

FOREIGN PATENT DOCUMENTS

| CN | 201198307 Y | 2/2009 |
| CN | 204801783 U | 11/2015 |
| DE | 4442263 A1 | 5/1996 |

(Continued)

*Primary Examiner* — Robert J McCarry, Jr.
(74) *Attorney, Agent, or Firm* — Laurence Greenberg; Werner Stemer; Ralph Locher

(57) ABSTRACT

A rail vehicle, in particular a locomotive, includes a railcar body having a head end provided with a front nose. The railcar body has an interface, in the region of the head end, which is configured and provided for fastening and connecting differently shaped front noses forming a set of variations. A front nose selected from the set of variations is thereby fastened to the interface by a welded connection. The rail vehicle therefore permits more flexibility in the shaping of the head end of the railcar body.

3 Claims, 4 Drawing Sheets

(56) References Cited

FOREIGN PATENT DOCUMENTS

| | | | |
|---|---|---|---|
| DE | 69818357 T2 | 6/2004 | |
| DE | 102012213019 A1 | 1/2014 | |
| EP | 0376351 A2 | 7/1990 | |
| EP | 2428422 A1 | 3/2012 | |
| EP | 2238011 B1 | 7/2012 | |
| EP | 2851257 A1 * | 3/2015 | ............ B61D 17/02 |
| EP | 2851257 A1 | 3/2015 | |
| RU | 132402 U1 | 9/2013 | |
| RU | 138267 U1 | 3/2014 | |
| SU | 541706 A1 | 1/1977 | |
| WO | 2011135033 A1 | 11/2011 | |
| WO | 2011154527 A1 | 12/2011 | |

* cited by examiner

RAIL VEHICLE, IN PARTICULAR LOCOMOTIVE

BACKGROUND OF THE INVENTION

Field of the Invention

The invention relates to a rail vehicle, in particular a locomotive, including a car body having a head end with a front nose.

Patent specification EP 2 238 011 B1 has disclosed a head component for a rail vehicle, which head component comprises a load bearing structure made from two side walls, a roof cover and a bottom wall. The load bearing structure has recesses for headlights, for front windows and storage spaces for the accommodation of ventilation technology systems. Furthermore, the load bearing structure comprises a lower driving girder and, below the front window recesses, a central crossmember for attaching a driver's desk. A releasable flange connection with locking collar pins is provided for mounting the load bearing structure on a rail car body of the rail vehicle.

The front nose of the head component of said known rail vehicle comprises a predefined, fixed shape which is formed by way of the front-side, curved ends of the side walls, by way of a metal sheet which covers the central crossmember, and by way of a front flap (not shown). A modification of the front nose shape requires a complicated redesign of the complete head component and its attachment to the rail car body.

EP 2 851 257 A1 has disclosed a rail vehicle having a railcar body which is divided into a main section and into a head section. A "flow separation section" which is preferably configured as a movable edge is arranged in the region of the main section.

EP 0 376 351 A2 has disclosed a device for reducing the air resistance and for damping the impact forces of a vehicle. Here, an adjustable front plate which is connected to skirt-shaped or wedge-shaped side walls is arranged on the front part and/or rear part of the vehicle.

DE 10 2012 213 019 A1 has disclosed a train head part having a cab. The cab comprises at least one roof module which is connected to the cab main body in such a way that it can be decoupled from it in a non-destructive manner.

WO 2011/154527 A1 has disclosed an apparatus for pivoting one or more front flaps of a railborne vehicle, and a front flap module.

SUMMARY OF THE INVENTION

The invention is based on the object of providing a rail vehicle of the type mentioned at the outset which allows greater flexibility in the design of the head end of its rail car body.

According to the invention, the object is achieved by way of a rail vehicle of the generic type having the features which are specified below. Accordingly, the rail vehicle, in particular a locomotive, comprises a railcar body having a head end which has a front nose. According to the invention, the railcar body has an interface in the region of its head end, which interface is configured and provided for fastening and connecting differently shaped front noses which form a set of variations. Here, a front nose which is selected from the set of variations is fastened to the interface by means of a welded connection. The core concept of the invention lies firstly in the provision of a set of variations of front noses which differ from one another at least in terms of their shape, and secondly in the provision of a uniform interface on the railcar body for all front noses of the set of variations for fastening and for connecting a front nose which is selected for its intended purpose. This permits a flexible design of the head end in the case of the use of the railcar body which is identical up to its interface. By way of said design freedom, the rail vehicle can be adapted easily to different requirements with regard to its aerodynamics. Whereas, in the case of a use of the rail vehicle in passenger transportation at high traveling speeds, a streamlined front nose leads to lower traction energy losses and traveling noise, the shape of the front nose can also be of flatter design in the case of a use in freight transportation. Differently shaped front noses also simply provide more configuration options for the vehicle design, however, in order to be able to comply with different client requirements, without it being necessary for the rail vehicle to be completely redesigned. By way of welding of the front nose to the interface, a fixed mechanical connection to the railcar body is achieved, which connection can withstand relatively light impacts of objects, for instance of ballast pieces which are whirled up from the rail track.

In one advantageous embodiment of the rail vehicle according to the invention, the interface is formed by way of front plates which extend transversely with respect to a vehicle longitudinal axis and are connected to a crossmember of the rail car body. The vertical front plates form a bulkhead which closes off the driver's cab of the rail vehicle to the front and is connected to a lower crossmember, which belongs to the subframe of the rail car body or is connected to it, and optionally to a central crossmember which runs at the level of the lower edge of the front windows and forms a load bearing structure for the driver's desk. The interface can comprise a coupler cage which is fixed on the lower crossmember, with ribs as a vertical lift protection means and a deflecting carrier for an obstacle deflector. The coupler cage has a passage opening for a center buffer coupler. Furthermore, the interface can have mechanical fastening means which are configured for welding on a front nose, and connector means which are configured for connecting pneumatic and/or electric lines.

In one preferred refinement of the rail vehicle according to the invention, a first front nose forms a suspended skirt shape which covers merely the front plates. Said first variation of the front nose is formed by way of a small-sized welded-on part set which can have headlight recesses for front headlights and a flap recess for a front flap. The flat skirt shape forms clear edges at the transitions of the front nose with respect to the side walls and with respect to the front wall of the rail car body, and is therefore less streamlined but can be produced simply and inexpensively.

In one advantageous refinement of the rail vehicle according to the invention, a second front nose forms an aerodynamic pointed shape which continues the course of a front wall and of side walls of the rail car body without the formation of edges. Said second variation of the front nose is formed by way of a larger-sized welded-on part set which can have headlight recesses for front headlights and a front recess for a front cover. At its tip, said front nose has a coupler opening which can be closed by way of a two-piece front flap. The welded-on parts are connected via a reinforcing carrying framework.

In one preferred embodiment of the rail vehicle according to the invention, the front noses have welded-on parts which are manufactured from steel. Steel welded-on parts afford a certain amount of protection against damage in the case of relatively small impacts by way of objects which lie on the rail track. Moreover, they increase the ease of repair, since damaged steel welded-on parts can be simply beaten out or cut out and can be replaced by newly welded welded-on parts.

BRIEF DESCRIPTION OF THE SEVERAL VIEWS OF THE DRAWING

Further properties and advantages of the invention result from the following description of one specific exemplary embodiment using the drawings, in which.

DESCRIPTION OF THE INVENTION

Figure 1:
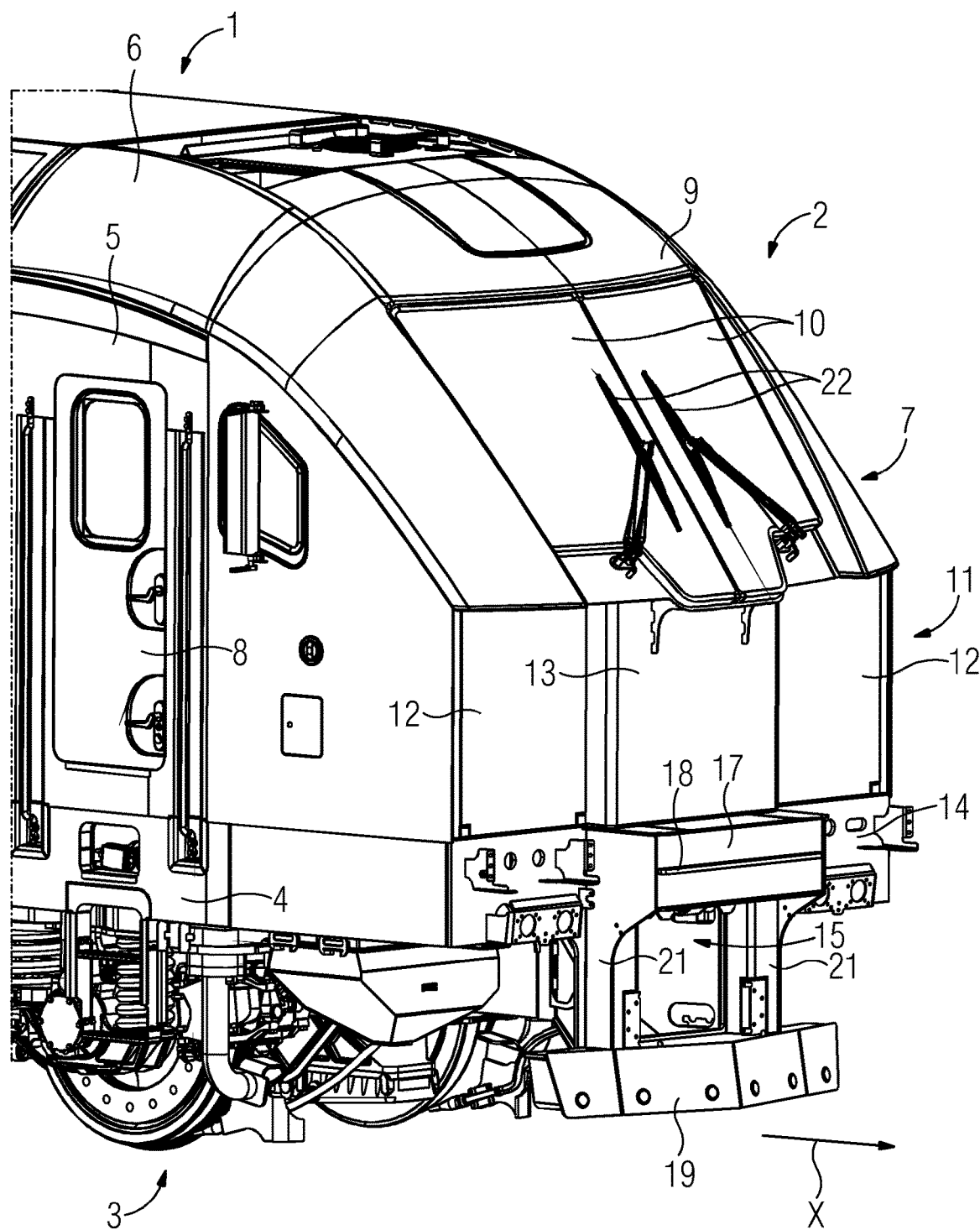
FIG. 1 shows a head end of a rail car body of a rail vehicle according to the invention without a front nose.

In accordance with FIG. 1, a rail vehicle which is configured as a locomotive 1 comprises a rail car body 2 which is supported in a sprung manner on bogies 3 which can be moved along a railway. The rail car body 2 has a subframe 4 which supports side walls 5 and a vehicle roof 6 which connects them. A machine space which accommodates drive components is situated in the rail car body 2, and a driver's cab which is accessible via driver's cab doors 8 in the side walls 5 is situated at at least one head end 7 of the rail car body 2. In the region of the head end 7, the vehicle roof 6 merges into an inclined front wall 9 which has recesses for front windows 10.

Figure 2:
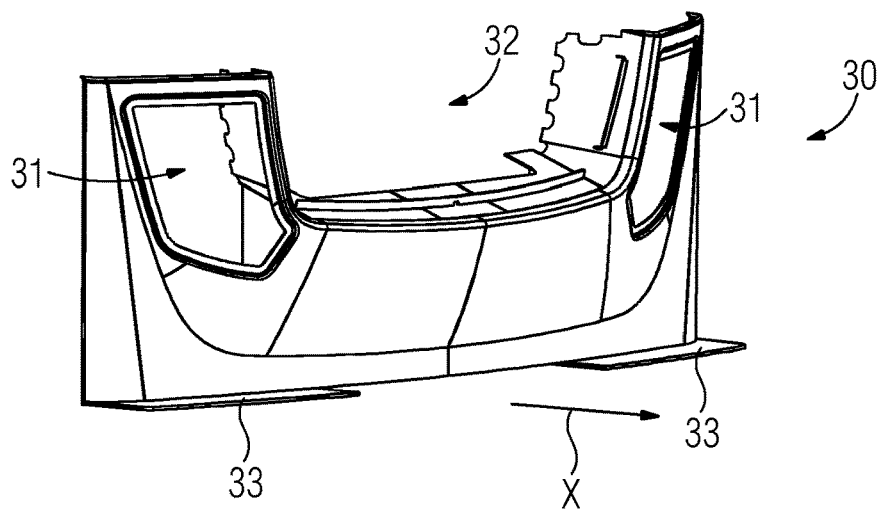
FIG. 2 shows a first variation of a front nose.
Figure 3:
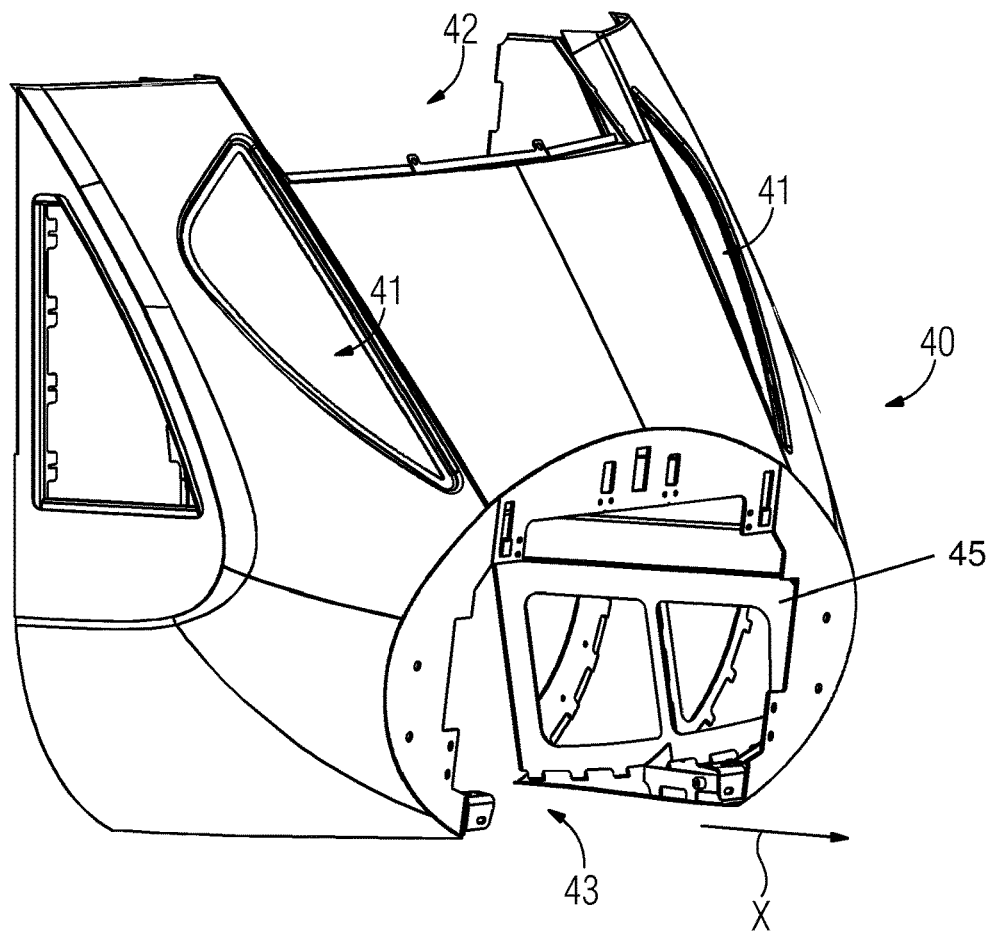
FIG. 3 shows a second variation of a front nose.

According to the invention, the rail car body 2 has an interface 11 in the region of its head end 7, which interface 11 is configured and provided for fastening and connecting differently shaped front noses 30 or 40 according to FIG. 2 or FIG. 3. The front noses 30 and 40 form a set of variations, from which a front nose 30 or 40 is selected (for example, by the operator in accordance with their intended use of the locomotive 1) and is fastened to the interface 11 by means of a welded connection. In this way, two variations of locomotives 1 can be provided, in the case of which the same rail car body 2 can be used apart from the front nose 20 or 30. The welded connection ensures a high mechanical stability of the front nose fastening in the case of impact loads in comparison with screwed or adhesively bonded connections. The interface 11 is formed by way of front plates 12 and 13 which extend transversely with respect to a vehicle longitudinal axis x, namely two lateral front plates 12 and a central front plate 13 which is arranged between the former but offset toward the front in the vehicle longitudinal direction x. The front plates 12 and 13 extend vertically from a lower crossmember 14 which is part of the sub frame 4 of the rail car body 2 or is connected to it, upward as far as a central crossmember (not shown) which runs approximately at the level of the lower edge of the front windows 10 and forms a load bearing structure for a driver's desk of the driver's cab. The interface 11 comprises a coupler cage which is fixed centrally on the front side of the lower crossmember 14 and has a passage opening 15 for a center buffer coupling 16 (shown in FIG. 4). The passage opening 15 is delimited upward by way of a box 17 which projects forward from the lower crossmember 14 and has ribs 18 which act as a vertical lift protection means, is delimited downward by way of a deflecting carrier 19 for fastening an obstacle deflector 20 (shown in FIG. 4 and FIG. 5), and is delimited laterally by way of two side supports 21 which connect the box 17 and the deflecting carrier 19, which overall form the coupler cage. The entire driver's cab, including the driver's desk, the interior trim, the front windows 10 with window wipers 22, the air conditioning unit and the like, is designed in such a way that it is situated completely behind the common interface 11 for different front noses 30 or 40. The interface 11 also has pneumatic connectors for the compressed air pipe work and electric connectors, for instance for front headlights 23.

Figure 4:
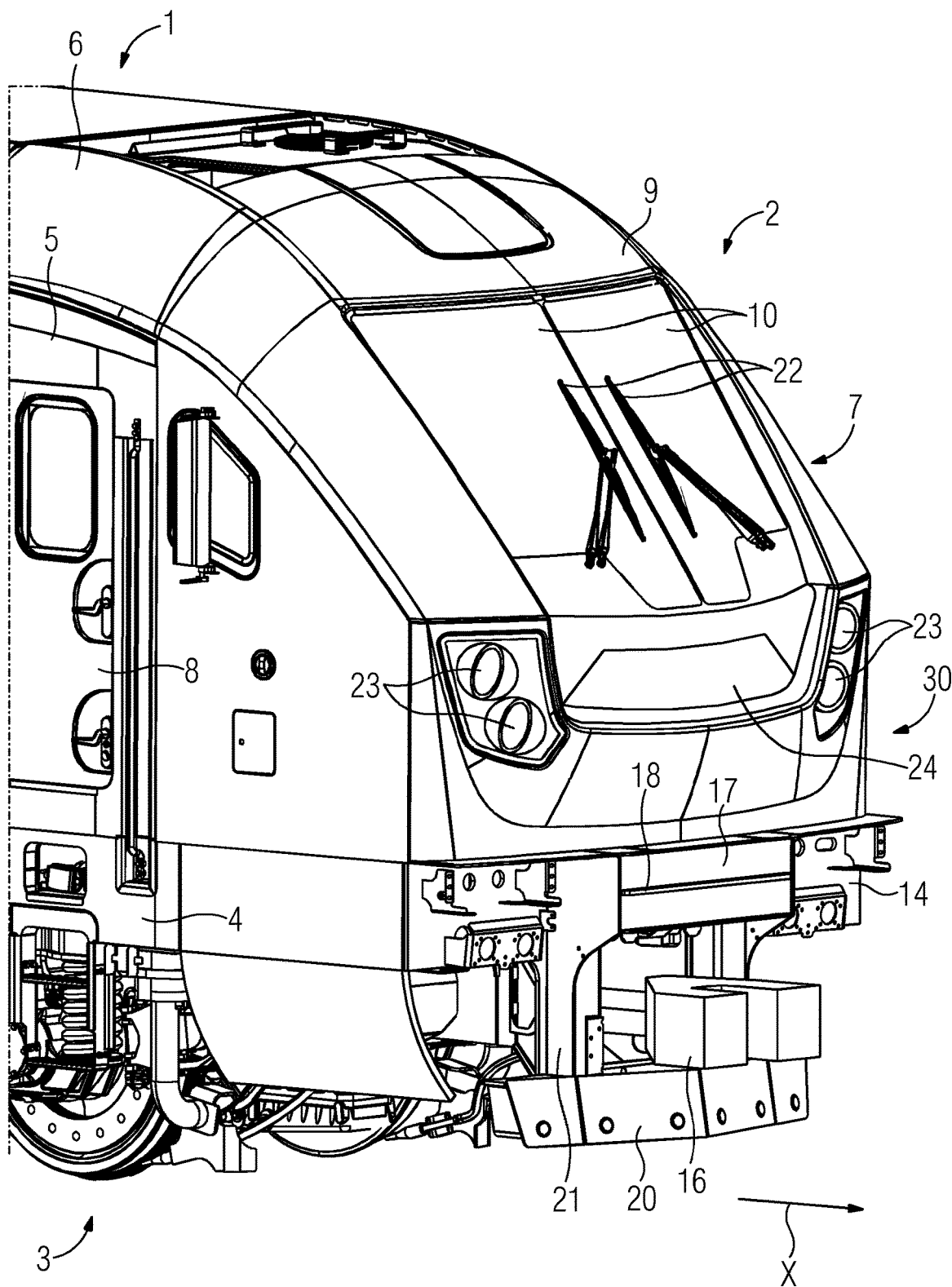
FIG. 4 shows the head end from FIG. 1 with a front nose according to FIG. 2.
Figure 5:
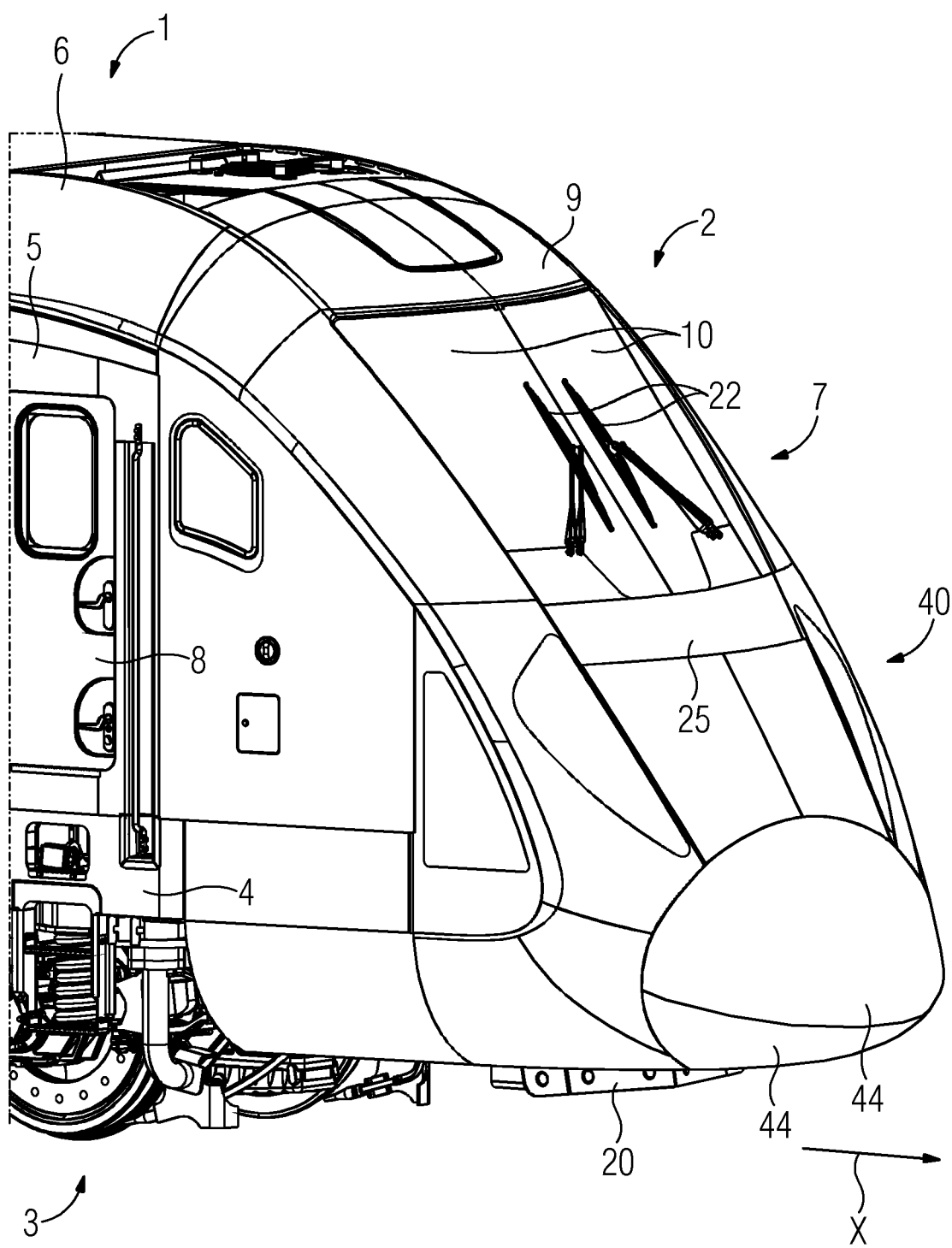
FIG. 5 shows the head end from FIG. 1 with a front nose according to FIG. 3, in each case illustrated diagrammatically in a perspective view.

The set of variations which is shown comprises a first front nose 30 according to FIG. 2 and FIG. 4 and a second front nose 40 according to FIG. 3 and FIG. 5, which front noses 30, 40 are shaped differently but can both be welded and connected to the interface 11 according to the invention. Without departing from the basic concept according to the invention, the set of variations can also comprise more than two differently shaped front noses.

FIG. 2 shows the first front nose 30, the individual welded-on parts of which form a suspended skirt shape, which runs approximately parallel to the plane of the interface 11, and cover merely its front plates 12 and 13. According to FIG. 4, the skirt shape forms clear edges at the transitions of the front nose 30 to the side walls 5 and to the front wall 9. Laterally, the front nose 30 has headlight recesses 31, and a flap recess 32 between them which can be closed by way of a front flap 24 (shown in FIG. 4). On its lower edge, the front nose 30 has two webs 33 which extend horizontally and, in the welded-on state of the front nose 30, form a continuous flat plane with the upper side of the box 17 of the coupler cage.

FIG. 3 shows the second front nose 40, the individual welded-on parts of which form an aerodynamic, round pointed shape which (according to FIG. 5) continues the inclined course of the front wall 9 and that of the side walls 5 without an edge. Laterally, the front nose 40 has headlight recesses 41, and a front recess 42 between them which can be closed by way of a front cover 25 (shown in FIG. 5). At its point, the front nose 40 has a coupler opening 43 which can be closed by way of a two-piece front flap 44. The welded-on parts of the front nose 40 are connected via a reinforcing carrying framework 45.

The welded-on parts, manufactured from steel, of the front noses 30 or 40 afford firstly a certain amount of protection against damage in the case of relatively small impacts by way of objects which lie on the rail track. Secondly, a welded front nose 30 or 40 allows a simple repair option by way of damaged welded-on parts being beaten out or by way of said damaged welded-on parts being cut out and replacement welded-on parts being newly welded on.

The invention claimed is:

1. A locomotive, comprising:
   a locomotive railcar body including a front wall, side walls, a longitudinal axis, a head end having a one front nose of a set of differently shaped front noses, an interface disposed in a region of said head end, and a cross member;
   said interface being configured and provided for fastening and connecting one of said front noses of said set of front noses by a welded connection;
   said interface being configured for connection to any one of said front noses to permit a flexible construction of said head end when used on railcar bodies being identical up to said interface;

said interface including front plates extended transversely relative to said longitudinal axis and being connected to said cross member;

said set of front noses including a first front nose forming a suspended skirt shape only covering said front plates; and said set of front noses including a second front nose forming an aerodynamically pointed shape continuing a course of said front wall and of said side walls of said railcar body without forming edges.

2. The locomotive according to claim 1, wherein said front noses of said set of front noses have welded-on steel parts.

3. The locomotive according to claim 1, wherein said head end has a center buffer coupling disposed below said first front nose.

\* \* \* \* \*